US012530152B2

(12) United States Patent
Erickson

(10) Patent No.: US 12,530,152 B2
(45) Date of Patent: Jan. 20, 2026

(54) MEMORY SYSTEM FOR FLEXIBLY ALLOCATING COMPRESSED STORAGE

(71) Applicant: Rambus Inc., San Jose, CA (US)

(72) Inventor: Evan Lawrence Erickson, Chapel Hill, NC (US)

(73) Assignee: RAMBUS INC., San Jose, CA (US)

( * ) Notice: Subject to any disclaimer, the term of this patent is extended or adjusted under 35 U.S.C. 154(b) by 0 days.

(21) Appl. No.: 18/887,285

(22) Filed: Sep. 17, 2024

(65) Prior Publication Data

US 2025/0110670 A1 Apr. 3, 2025

Related U.S. Application Data

(60) Provisional application No. 63/587,037, filed on Sep. 29, 2023.

(51) Int. Cl.
*G06F 3/06* (2006.01)
(52) U.S. Cl.
CPC .......... *G06F 3/0659* (2013.01); *G06F 3/0608* (2013.01); *G06F 3/0631* (2013.01); *G06F 3/0673* (2013.01)
(58) Field of Classification Search
CPC .... G06F 3/0659; G06F 3/0608; G06F 3/0631; G06F 3/0673; G06F 3/0679
USPC .................................................. 711/154, 100
See application file for complete search history.

(56) References Cited

U.S. PATENT DOCUMENTS

| | | | |
|---|---|---|---|
| 6,549,995 B1 | 4/2003 | Schulz et al. | |
| 7,039,769 B2 | 5/2006 | Castelli et al. | |
| 7,047,382 B2 | 5/2006 | Geiger et al. | |
| 10,203,901 B2 | 2/2019 | Malyugin et al. | |
| 10,565,099 B2 | 2/2020 | Sokol, Jr. | |
| 10,970,203 B2 | 4/2021 | Sokol, Jr. | |
| 2009/0254705 A1 | 10/2009 | Abali et al. | |
| 2012/0260009 A1* | 10/2012 | Lu | G06F 3/0679 710/52 |
| 2020/0285392 A1* | 9/2020 | Cho | G06F 3/061 |
| 2024/0094908 A1* | 3/2024 | Agrawal | G06F 3/0608 |

* cited by examiner

*Primary Examiner* — Hosain T Alam
*Assistant Examiner* — Zubair Ahmed
(74) *Attorney, Agent, or Firm* — Amsel IP Law PLLC; Jason Amsel

(57) ABSTRACT

A memory system enables a host device to flexibly allocate compressed storage managed by a memory buffer device. The host device allocates a first block of host-visible addresses associated with the compressed region and a memory buffer device allocates a corresponding second block of host-visible memory. The host device may migrate uncompressed data to and from compressed storage by referencing an address in the second block (with compression and decompression managed by the memory buffer device) and may migrate compressed data to and from compressed storage (bypassing compression and decompression on the memory buffer device) by instead referencing an address in the first block.

20 Claims, 11 Drawing Sheets

MEMORY SYSTEM FOR FLEXIBLY ALLOCATING COMPRESSED STORAGE

CROSS-REFERENCE TO RELATED APPLICATIONS

This application claims the benefit of U.S. Provisional Application No. 63/587,037 filed on Sep. 29, 2023, which is incorporated by reference herein.

BACKGROUND

In a memory system, a host facilitates read and write operations associated with one or more memory devices. Because memory capacity may be limited, a memory system may compress select pages of memory. However, use of compressed pages may implicate tradeoffs in read/write latency of memory operations.

BRIEF DESCRIPTION OF THE DRAWINGS

The teachings of the embodiments herein can be readily understood by considering the following detailed description in conjunction with the accompanying drawings.

DETAILED DESCRIPTION

A memory system enables a host device to flexibly allocate compressed storage managed by a memory buffer device. To control allocation, the host device allocates a first block of host-visible addresses (a "restricted range") associated with a compressed region of storage. In response, the memory buffer device allocates a second block of host-visible memory addresses (a "shadow range") to be associated with the compressed region. The host device may migrate uncompressed data to and from compressed storage by referencing an address in the second block ("shadow range") with compression and decompression managed by the memory buffer device. The host device may directly migrate compressed data to and from compressed storage (bypassing compression and decompression on the memory buffer device) by instead referencing an address in the first block ("restricted range"). The host device may control the allocated size of the compressed storage and control whether data is stored to compressed or uncompressed storage depending on current memory requirements or other operating parameters.

Figure 1:
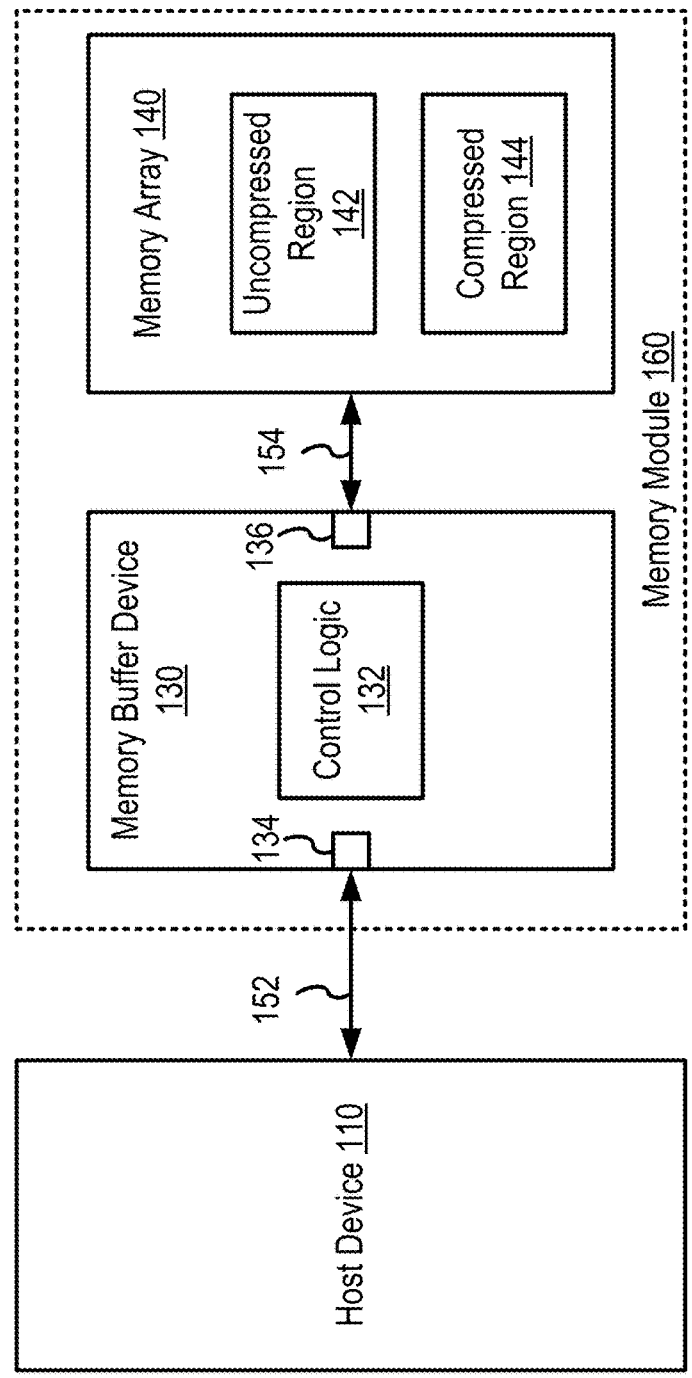
FIG. 1 is a block diagram illustrating a first example embodiment of a memory system.
Figure 2:
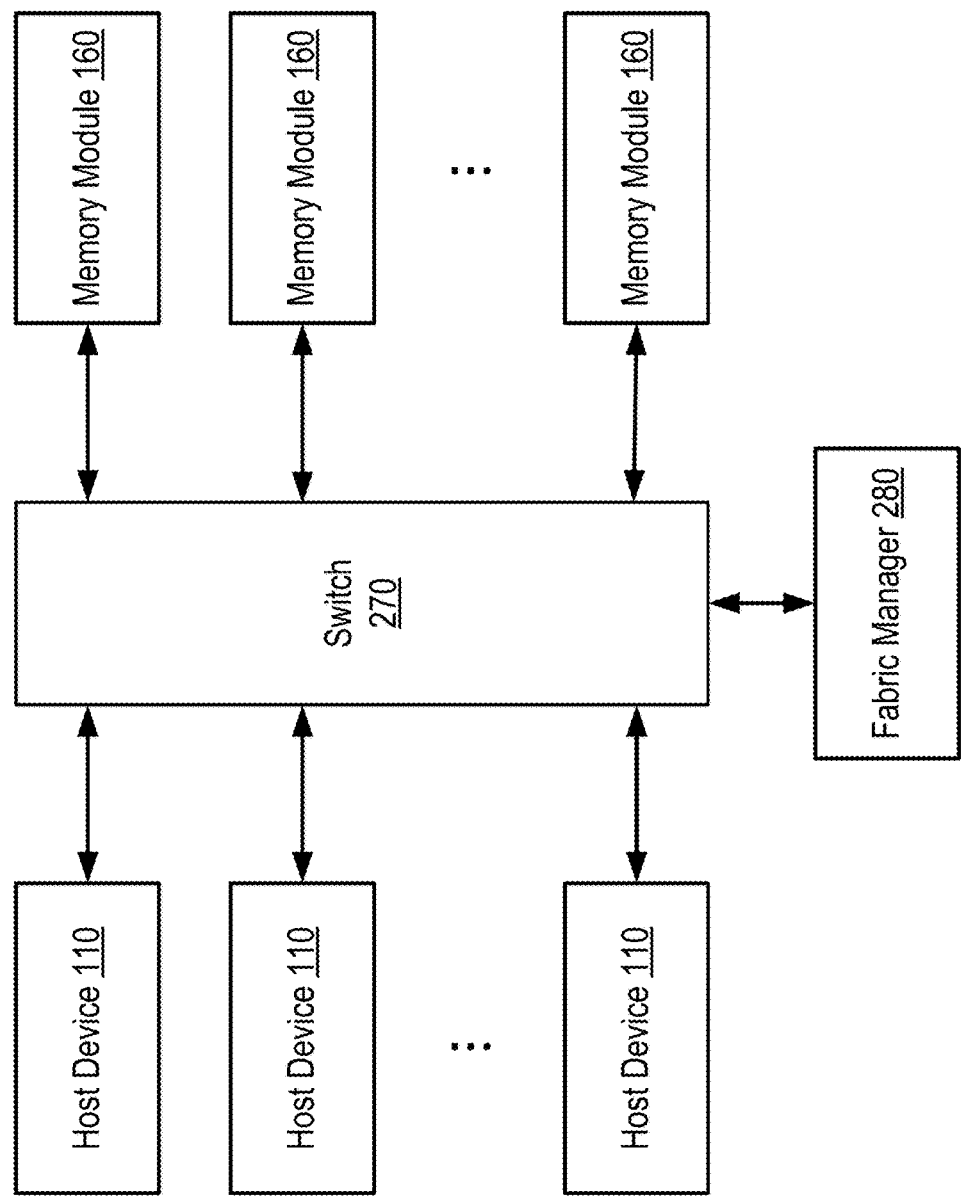
FIG. 2 is a block diagram illustrating a second example embodiment of a memory system.

FIG. 1 illustrates an embodiment of a memory system 100 comprising a host device 110, a memory buffer device 130, and a memory array 140. The host device 110 communicates with the memory buffer device 130 over a communication link 152. The memory buffer device 130 facilitates memory operations of the memory array 140 via the communication link 154 based on commands from the host device 110. The memory buffer device 130 and the memory array 140 may be integrated in a memory module 160, which may comprise separate integrated circuits on a printed circuit board or may comprise a single integrated circuit chip. Although FIG. 1 illustrates only a single memory buffer device 130 and memory array 140, various embodiments may include a memory module 160 that includes more than one memory buffer device 130 coupled to a single host device 110 and/or may include multiple memory arrays 140 that interoperate with one or more memory buffer devices 130. Furthermore, as shown in FIG. 2 described below, multiple host devices 110 may be coupled to a memory module 160 via shared or separate communication links 152 in a pooled memory configuration.

In an embodiment, the memory system 100 comprises a remote serial-attached memory system in which the communication link 152 between the host device 110 and the memory buffer device 130 comprises a serial link that communicates serialized packetized commands and data. For example, the communication link 152 may comprise a Compute Express Link (CXL) interface, an Open Memory Interface (OMI), a Coherent Accelerator Processor Interface (CAPI), a Peripheral Component Interconnect Express (PCIe) interface, or other interfaces. The memory buffer device 130 and the memory array 140 may be embodied in a serial-attached memory module 160, such as a CXL module. In these embodiments, the memory buffer device 130 may include logic for converting between the serialized communication protocol of the communication link 154 and the memory control/data communication protocol of communication link 152.

The memory array 140 may comprise one or more dynamic random-access memory (DRAM) devices that couples with the memory buffer device 130. Alternatively, the memory array may comprise one or more FLASH memory devices, other types of memory devices, or a combination of different types of memory devices. In a memory write operation, the memory array 140 receives a memory write command including a memory address and receives write data over the communication link 154. The memory array 140 stores the received write data to the memory address specified in the memory write command. In a memory read operation, the memory array 140 receives a read command including a memory address, and outputs read data stored at the memory address over the communication link 154. The memory array 140 may furthermore perform other operations responsive to received commands such as refresh operations, precharge operations, mode register read and write operations, and other memory operations.

Data in the memory array 140 may be organized into pages comprising fixed-sized blocks, each comprising some number of cache lines. For example, the memory array 140 may be organized into 4 kilobyte (KB) pages that each comprise 64 cache lines of data. The host device 110 identifies pages by their respective host physical addresses (HPA) corresponding to the start of each page.

The memory array 140 may include an uncompressed region 142 designated for storing data in uncompressed form and a compressed region 144 designated for storing data in compressed form. Compressed pages take up less memory relative to uncompressed pages. For example, if data is compressed 2:1, two compressed pages may be stored in the same size memory space of the compressed region 144 as a single uncompressed page in the uncompressed region 142. In practice, compression ratios may be variable dependent on the specific data being compressed or other factors. The respective sizes and address ranges associated with the uncompressed region 142 and the compressed region 144 may be fixed, or may be dynamically configurable by the host device (e.g., at boot).

Read and write operations associated with the compressed region 144 may have increased latency relative to operations associated with uncompressed region 142 (e.g., due to latency associated with compression and/or decompression). Therefore, the host device 110 may selectively determine whether or not to compress data depending on available memory space or other requirements.

In an embodiment, the memory system 100 may be configured to operate according to a Non-Uniform Memory Access (NUMA) architecture in which the memory array 140 functions as one or more NUMA nodes. Here, the uncompressed region 142 may present to the host device 110 as a first NUMA node and the compressed region 144 may present as a second NUMA node. In further embodiments, the memory array 140 may include multiple NUMA nodes for uncompressed storage and/or multiple NUMA nodes for compressed storage.

The memory buffer device 130 includes a host-side interface 134, control logic 132, and a memory-side interface 136. The host-side interface 134 comprises one or more ports for communicating commands, command responses, and data between the host device 110 and the memory buffer device 130. In a CXL-based system, the host-side interface 134 may packetize outgoing signals for sending to the host device 110 and depacketize incoming signals received from the host device 110. The memory-side interface 136 comprises a set of ports for communicating with the memory array 140. For example, the memory-side interface 136 may include at least a CA port for communicating memory write and memory read commands to the memory array 140, a DQ port for communicating write data and read data, and various timing/control ports.

The control logic 132 facilitates various memory operations. For example, the control logic 132 may facilitate read and write operations to either the uncompressed region 142 or the compressed region 144 based on commands received from the host device 110. Write operations to the uncompressed region 142 and read operations from the uncompressed region 142 may be performed according to standard memory operations (e.g., cache line writes and reads or page-level migrations). For write operations to the compressed region 144, the control logic 132 may compress data received from the host device 110 and write the compressed data to the compressed region 144. For read operations from the compressed memory region 144, the control logic 132 may access the compressed data, decompress it to uncompressed data, and send the uncompressed data to the host device 110. As will be described further below, the memory array 140 may be configured to enable the host device 110 to use different HPA ranges to access the uncompressed region 142 or the compressed region 144. For write operations, the host device 110 can send compressed data and control whether data is stored compressed or uncompressed dependent on the selection of the HPA for the write. For read operations, the host device 110 can obtain uncompressed data regardless of whether it is stored in compressed or uncompressed form. The host device 110 may furthermore facilitate at least basic read and write operations with a common command set for operating in the uncompressed region 142 or the compressed region 144. The host device 110 need not necessarily manage compression parameters or directly control compression and decompression.

The control logic 132 may furthermore facilitate various data migrations in response to vendor-defined messages (VDMs) from the host device 110. For example, the control logic 132 may facilitate migration of host-compressed data from the host device 110 to the compressed region 144 or migration of compressed data from the compressed region 144 directly to the host device 110 in compressed form (i.e., without decompression by the control logic 132). The control logic 132 may furthermore issue commands for the memory buffer device 130 to facilitate migrations between the uncompressed region 142 and compressed region 144 (including performing compression or decompression) in response to VDMs from the host device 110.

The host device 110 may comprise various processing and storage elements. The host device 110 may facilitate a virtual memory addressing technique in which each process executed by the host device 110 is assigned its own virtual memory space abstracted from the HPAs referencing the physical memory locations. Each virtual memory address of a process may be mapped to a corresponding HPA (e.g., via a host-side page table). This virtualization techniques enables multiple processes to utilize overlapping virtual memory spaces that map to different HPA spaces to avoid conflicts.

Memory operations of the host device 110 may be specified at cache-line granularity. For example, the host device 110 may send a write command to write a specific cache line or send a read command to read a specific cache line. As described above, the host device 110 may select whether to write compressed data or uncompressed data by selecting an HPA in the desired region. When writing a cache line to the compressed region, the memory buffer device 130 may decompress the corresponding compressed page (or a portion thereof) to a uncompressed cache, write the cache line, and then recompress the page. When reading a cache line from the compressed region, the memory buffer device 130 may decompress the corresponding page (or a portion thereof) to the uncompressed cache and then read the requested cache line from the uncompressed cache. Furthermore, access to the compressed region 144 may occur without page faults or other operations on the host device 110 different than those employed for accesses to the uncompressed region 142.

FIG. 2 illustrates another example of a memory system 200 that includes a pooled memory architecture. Here, one or more host devices 110 are coupled to one or more pooled memory modules 160 (which may operate remotely from the host devices 110) via a switch 270. In this configuration, available memory of the memory modules 160 may be shared between two or more host devices 110. The fabric manager 280 operates to coordinate between the multiple host devices 110 and facilitate memory allocation of available memory to different host devices 110. For example, the fabric manager 280 may dynamically allocate memory to different host devices 110 depending on memory requirements of the different devices 110. In another embodiment, a switch 270 may be incorporated into one or more individual memory modules 160 and operates to switch multiple host devices 110 with one or more memory buffer devices 130 of the individual memory module 160.

Figure 3:
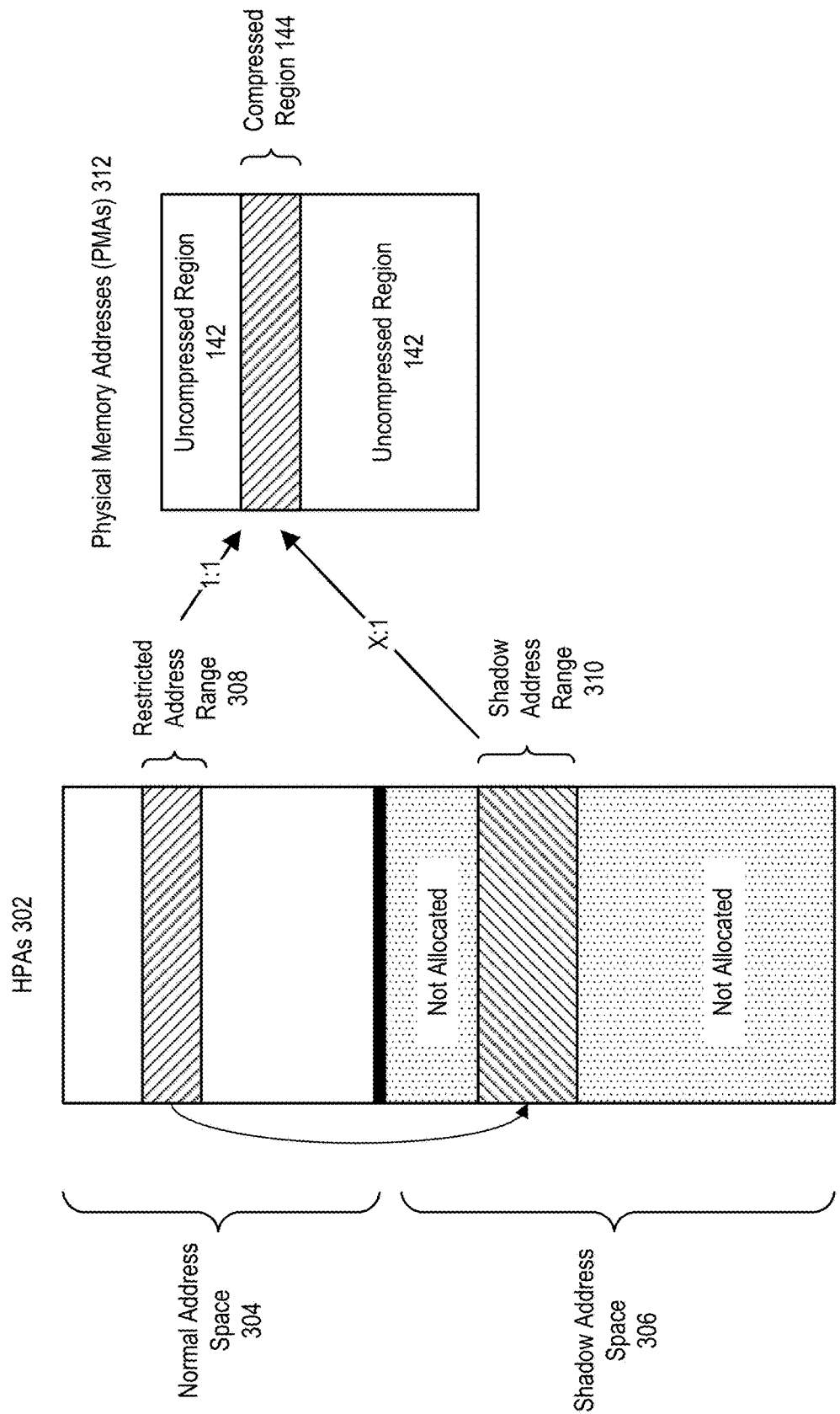
FIG. 3 is an example logical configuration of a memory structured for flexible allocation of compressed storage.

FIG. 3 illustrates an example embodiment of a logical organization of address spaces for a memory array 140. The memory array 140 is represented by a set of physical memory addresses (PMAs) 312 that include memory addresses for the uncompressed region(s) 142 and the compressed region 144. The specific location of the compressed region 144 is arbitrary. In different examples, the compressed region 144 may occupy different sets of PMAs 312 and may be contiguous or non-contiguous.

The HPAs 302 includes a normal address space 304 and a shadow address space 306. Addresses in the normal address space 304 generally have a one-to-one correspondence with the PMAs 312. For example, for page-level accesses, the normal address space 304 may include a unique address for each uncompressed page of the physical memory and its associated PMA 312. The normal address space 304 may be allocated by the host device 110 or memory buffer device 130 in a non-pooled memory system 100 or may be allocated by a fabric manager 280 in a pooled memory system 200 (e.g., via one or more commands to the memory buffer device 130). The mapping between the HPAs 302 and the PMAs 312 may be controlled by one or more levels of address translation using, for example, a device-side page table structure of the memory buffer device 130, one or more decoders, or other translation structures.

The host device 110, memory buffer device 130, or fabric manager 280 may allocate the compressed region 144 by specifying a range of HPAs 302 in the normal address space 304 (which point to a corresponding range of PMAs 312 that become the compressed region 144). The HPAs 302 allocated to the compressed region 144 may be designated as a restricted address range 308. The host device 110 may restrict allocation of this address range to processes (or a fabric manager 280 may restrict allocation to an individual host device 110). Furthermore, either the host device 110 or memory buffer device 130 (or both) may restrict writes to this restricted address range 308. The allocation of the compressed region 144 may occur upon initial allocation of the HPAs 302 to the host device 110, or the host device 110 may convert some or all of the allocated uncompressed region 142 to a compressed region 144 (e.g., via a VDM) after initial allocation.

Upon allocating the restricted address range 308 (and corresponding compressed region 144), the memory buffer device 130 allocates a shadow address range 310 in a preconfigured shadow address space 306. Alternatively, this allocation may be controlled by the host device 110 or a fabric manager 280. In another implementation, the shadow address range 310 may be allocated in advance of the restricted address range 308 being allocated. In this case, a set of addresses are initially reserved for the shadow address range 310 and may be mapped to the addresses in the restricted address range 308 when it is allocated. Usage of the pre-allocated shadow address range 310 may be initially restricted and subsequently enabled when a restricted address range 308 (and corresponding compressed region 144) is allocated.

The addresses in the shadow address range 310 point to the same compressed region 144 (i.e., same range of PMAs 312) as the restricted address range 308. The addresses in the shadow address range 310 may be referenced by the host device 110 to read or write data with compression and decompression managed by the memory buffer device 130. The memory buffer device 130 manages compression and decompression based on compression context metadata that may include at least a base address for the compressed data, its size (e.g., in cache lines), and other compression/decompression parameters like a dictionary identifier. The host device 110 can therefore request these operations without page faults and without accessing the compression context metadata used for compression and decompression. For a write operation, the host device 110 may issue a write to an address in the shadow address range 310, and the memory buffer device compresses the data into the compressed region 144 and stores associated compression context metadata that enables decompression. For a read operation, the host device 110 may issue a read to an address in the shadow address range 310 and the memory buffer device 130 decompresses the data based on the compression context metadata and returns decompressed data to the host device 110. The host device 110 may access addresses in the shadow address range 310 at cache line granularity in the same manner as uncompressed data. The host-side page tables may furthermore store virtual addresses for the shadow HPAs 302 at page-level granularity in the same manner as for uncompressed pages in the uncompressed region 142. Thus, the host device 110 may interact with pages stored in compressed form in a manner that is substantially indistinguishable from accesses in the uncompressed region 142 from the perspective of the host device 110.

Pages in the shadow address range 310 includes the same size address range as pages in the normal address space 304. For example, the shadow address range 310 includes a 4 KiB address range for a page compressed from a 4 KiB uncompressed page, even though the compressed page occupies less than 4 KiB of physical memory. The shadow address range 310 may therefore include a wider range of addresses than the corresponding restricted address range 308 to accommodate a larger number of pages in the same size physical memory. For example, if 2:1 compression is performed, the shadow address range 310 may be twice as wide as the restricted address range 308 because the restricted address range 308 is based on storage available for uncompressed pages while the shadowed address range 310 is based on storage available for compressed pages. Thus, in embodiments in which the memory module 160 presents as separate NUMA nodes for uncompressed and compressed storage, the host device 110 may observe, for example, a 1 TiB NUMA node for an uncompressed region 142 and a 2 TiB NUMA node for a compressed region 144, in which the size of respective nodes represents the ranges of addresses visible to the host device 110 at uncompressed granularity.

The host device 110 (or fabric manager 280) may flexibly control how HPAs are allocated to processes depending on memory pressure (i.e., demand for memory relative to supply) or other factors. If memory pressure is high, the host device 110 (or fabric manager 280) may allocate more HPAs 302 to the compressed region 144. If memory pressure is low, the host device (or fabric manager 280) may allocate fewer HPAs to the compressed region 144 to avoid unnecessary latency associated with compression and decompression. Executing processes may furthermore determine whether to utilize allocated HPAs 302 in the normal address space 304 or the shadow address range 310 to enforce uncompressed or compressed storage.

Because the achieved compression ratio may be variable, the physical memory in the compressed region 144 may be insufficient to support the entire allocated shadow address range 310 depending on the allocated size of the shadow address range 310 relative to the size of the compressed region 144 and the compression ratio achieved. To manage actual capacity of the compressed region 144, the memory buffer device 130 may track available capacity in the compressed region 144 (e.g., in a device-side register) and may provide this information to the host device 110 (e.g., in response to a VDM or register read) to ensure that the host device 110 does not attempt to write compressed data that overruns the available capacity.

The configuration of FIG. 3 results in two different HPAs 302 (one in the restricted address range 308 and one in the shadow address range 310) that may point to the same underlying data in the compressed region 144. This enables the host device 110 to access the compressed data in two ways: by referencing a shadow address to request decompression on the memory buffer device 130 such that the data is provided to the host device 110 in uncompressed form, or by referencing a restricted address to request the data in its compressed form for decompression on the host device 110. For example, to access compressed data directly, the host device 110 may issue a VDM referencing a shadow HPA in the shadow address range 310 requesting the compression context metadata, which may include the corresponding address in the restricted address range 308, the size of the compressed page, or other parameters for decompression. The host device 110 may then utilize the compression context metadata to facilitate direct migration of compressed data by issuing reads to the restricted address in the restricted address range 308 (e.g., corresponding to a compressed portion of a cache line or compressed portions of multiple cache lines). The memory buffer device 130 can treat these accesses to the restricted address range 308 as a request for the compressed data in its compressed form (without decompression).

Figure 4:
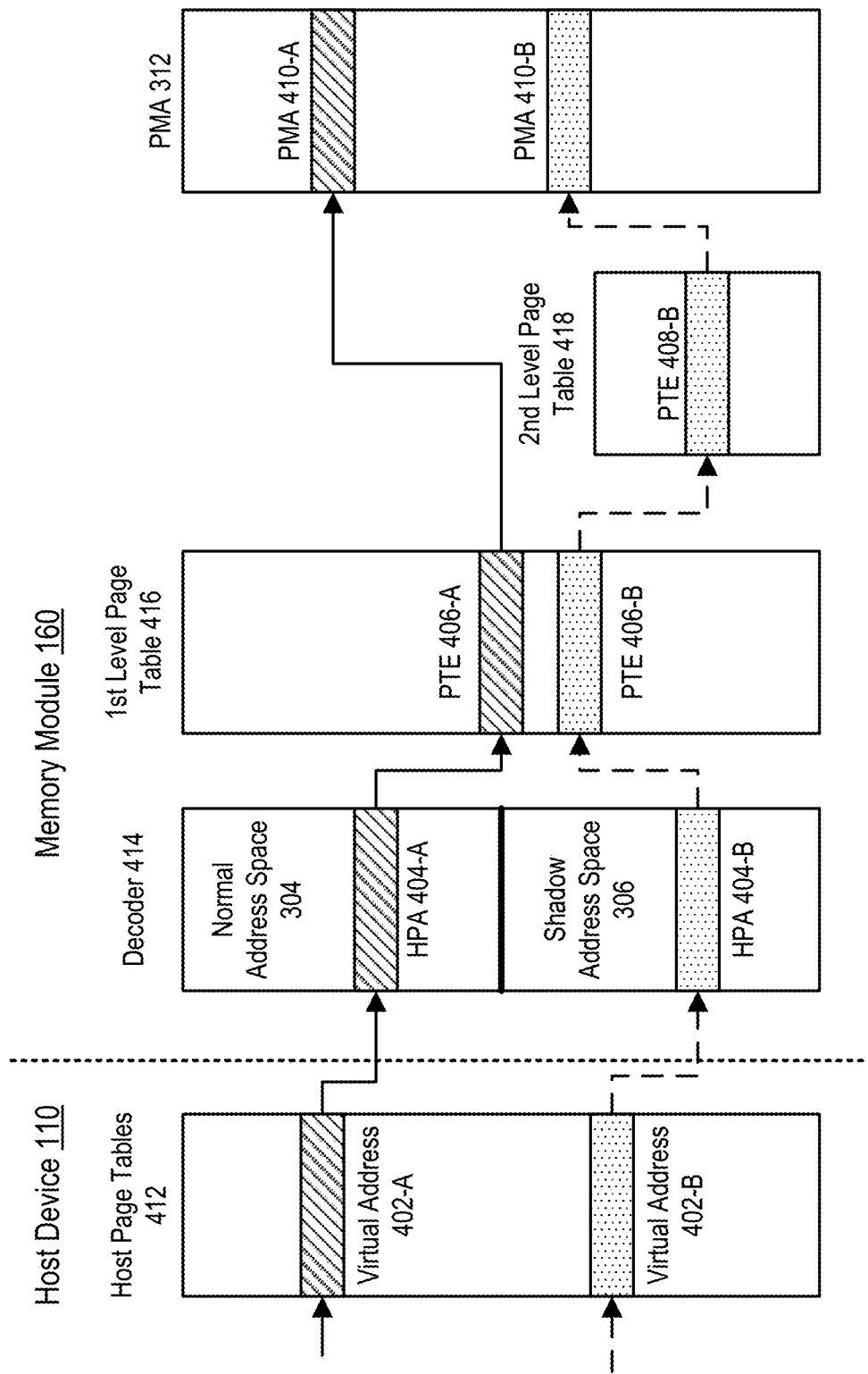
FIG. 4 is an example embodiment of a processing path for a memory system with compressed storage.

FIG. 4 illustrates an example logical flow associated with implementing memory operations using the logical configuration described above. In a first operation (solid line path), the host device 110 obtains a virtual address 402-A from an executing process and derives a corresponding HPA 404-A using the host device page tables 412 or similar translation logic (e.g., translation lookaside buffer (TLB)). In this first example, the HPA 404-A is in the normal address space 304 and is outside of the restricted address range 308. The memory buffer device 130 receives the HPA 404-A, and a decoder 414 decodes the HPA 404-A to identify a page table entry 406-A in a first-level page table 416. The first-level page table 416 maps the decoded HPA 404-A to a PMA 410-A. The memory operation (e.g., a read or a write) may then be carried out to write or read uncompressed data to or from the PMA 410-A.

In a second operation, (dashed line path), the host device 110 obtains another virtual address 402-B and derives the corresponding HPA 404-B, which this time falls in the shadow address space 306, thus indicating that it references compressed data. The memory buffer device 130 decodes the HPA to identify a relevant page table entry 406-B. In this implementation, the PTEs 406-B points to a page table entry 408-B in a $2^{nd}$ level page table 418 associated with compressed data. The page table entry 408-B includes compression context metadata that points to the relevant PMA 410-B for storing the compressed data and includes the various compression parameters that enables the memory buffer device 130 to perform compression and decompression.

In an embodiment, the first-level page table 416 may be configured for deferred allocation. Here, each first-level page table entry may be associated with a range of HPAs allocated to the host device 110, but the memory buffer device 130 defers allocation of PMAs 312 to those HPAs until memory operations are issued to actually write to those HPAs. The deferred allocation technique may enable the memory buffer device 130 to present as having more allocatable memory than is actually available in physical memory. The $2^{nd}$ level page table 418 may be utilized for addresses in the shadow address space 306 to provide the compression context metadata enabling compression and decompression.

Figure 5:
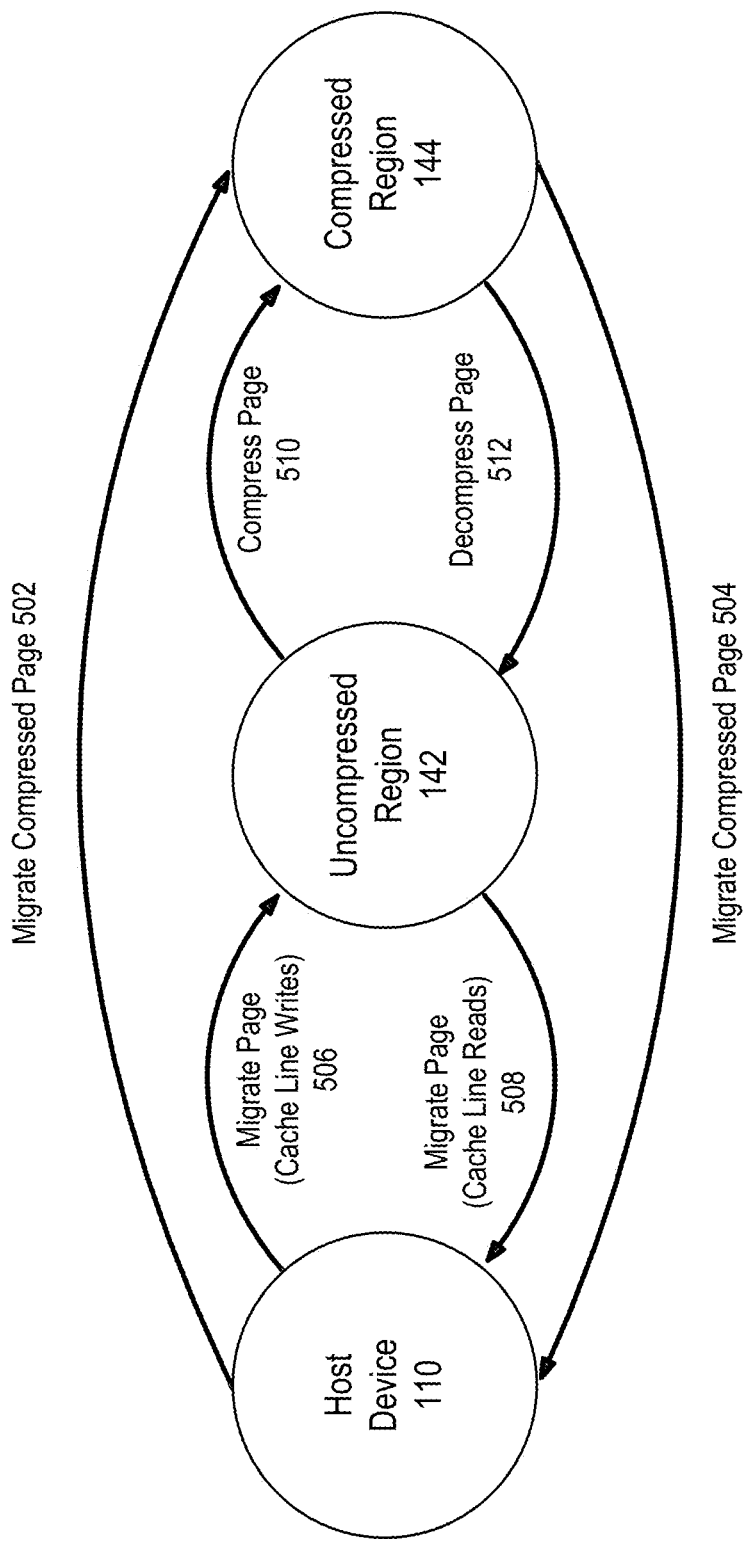
FIG. 5 is a diagram illustrating migration paths associated with a memory system with compressed storage.

FIG. 5 is a diagram illustrating possible data migration paths that may be enabled by the described memory system 100, 200. The host device 110 may directly migrate 502 host-compressed pages to the compressed region 144. In one implementation, a migration 502 of compressed data may occur by the host device 110 first sending a VDM with the compression context metadata, followed by the host device 110 writing the compressed data to one or more addresses in the shadow address range 310. Based on receiving the VDM and compression context metadata in advance, the memory buffer device 130 may cache or buffer the write data until it can be written to the compressed region 144. In another implementation, the host device 110 may first write the compressed data to one or more addresses in the shadow address range 310, followed by sending a VDM with the compression context metadata. Here, the memory buffer device 130 may cache the compressed data and then write the cached data to the compressed region 144.

The host device 110 may also request that the memory buffer device 130 directly migrate 504 compressed pages (without decompression) from the compressed regions 144 to the host device 110. Here, the host device 110 may request compression context metadata for an HPA or range of HPAs 302 via a VDM. The memory buffer device 130 then returns compression context metadata including at least a base address in the restriction address range 308 for the compressed data and its size (e.g., in cache lines). If the host device 110 requests migration from a range of addresses in the shadow address range 310, the memory buffer device 130 may provide a series of responses with the respective compression context metadata for the requested addresses. After receiving the compression context metadata, the host device 110 may read pages to be migrated in compressed form. The host device 110 may then send another VDM to free the addresses of compressed data that was read to enable the memory buffer device 130 to reclaim the shadow addresses and restricted space memory for subsequent compressed storage and update its tracking of available compressed storage in the compressed region 142.

The host device 110 may furthermore migrate 506 uncompressed pages from the host device 110 to the uncompressed region 142 and migrate 508 uncompressed pages from the uncompressed region 142 to the host device 110. These operations may be performed using VDMs or by performing cache line writes and reads addressed to an HPA in the normal address space (excluding the restricted address range).

The host device 110 may furthermore request, via VDMs, that the memory buffer device 130 compress 510 uncompressed pages from the uncompressed region 142 into compressed pages in the compressed region 144 (by performing compression) or decompress 512 compressed pages from the compressed region 144 to uncompressed pages in the uncompressed region 142. For compression 510, the memory buffer device 130 may provide a response to the host device 110 with an HPA 302 in the shadow address range 310 that the host device 110 can use to access the compressed page. The host device 110 may then update its page table with the HPA 302 and can free the original source HPA 302 in the uncompressed region 142. Selection of the shadow HPA 302 can alternatively be determined by the host device 110 and included in the VDM requesting the compression 510. In this case, the memory buffer device 130 need not provide the response with the shadow HPA 302. For decompression 512, the host device 110 may include an HPA 302 in the normal address space 304 for the memory buffer device 130 to store the decompressed data. The freed shadow HPA 302 of the original compressed data and the memory storing the compressed data may then be reused for subsequent compressed storage.

As described above, cache line reads and writes may also be performed by memory operations referencing an HPA in the shadow address space. For write operations, the host device 110 sends data in uncompressed form (via path 508) and the memory buffer device 130 compresses 510 the data into the compressed region 144. Here, the memory buffer device 130 may decompress a relevant page to a device-side cache, write the cache line, and later compress the entire page into the compressed region 144. Alternatively, the memory buffer device 130 may decompress, write, and re-compress a portion of a page or single cache line. For read operations, the host device 110 requests data (e.g., a page, portion of a page, or cache line) from an HPA in the shadow address space, and the memory buffer device 130 reads the data, decompresses it, and sends the uncompressed data to the host device 110. Here, the memory buffer device 130 may decompress the whole page to a device-side cache and send only the requested cache line.

Figure 6:
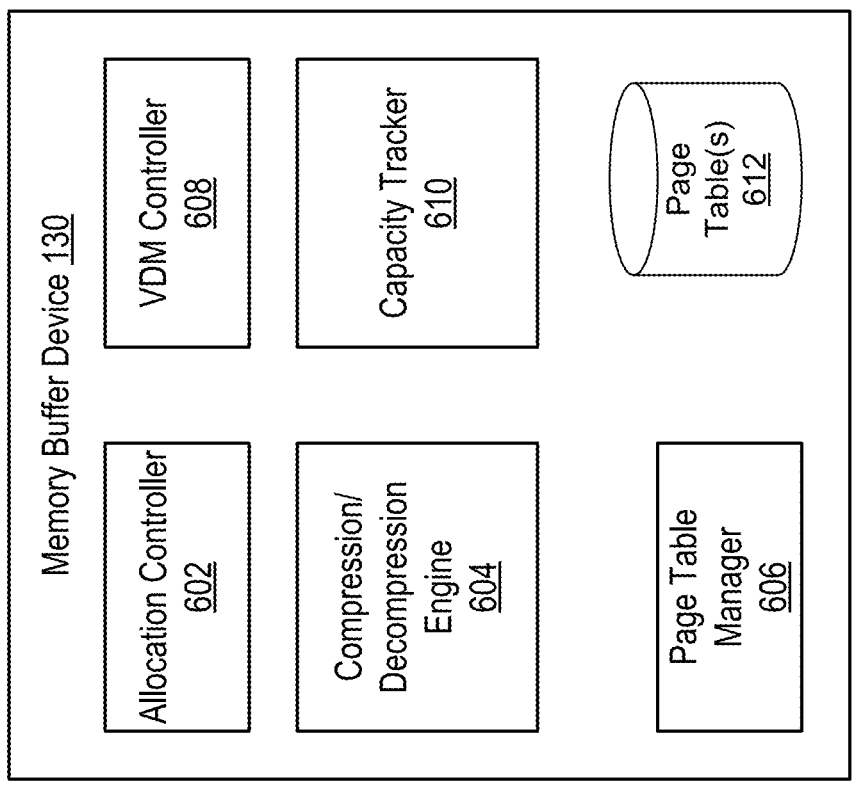
FIG. 6 is a block diagram illustrating an example architecture for a memory buffer device.

FIG. 6 is an example embodiment of a memory buffer device 130. The memory buffer device 130 includes an allocation controller 602, a compression/decompression engine 604, a page table manager 606, a VDM controller 608, a capacity tracker 610, and one or more page tables 612.

The allocation controller 602 controls allocation of the shadow address space 306 and the shadow address range(s) 310 corresponding to compressed region(s) 144 of the memory array 140. The size of the shadow address space 306 may be statically preset or may be dynamically configurable by the memory buffer device 130 depending on the compression ratio or other factors. Generally, the shadow address range 310 allocated for a compressed region 144 may be larger than the corresponding restricted address range 308 by a ratio related to the expected compression ratio. For example, the shadow address range 310 may be 2-4 times larger than the corresponding restricted address range 308 in the normal address space 304 to account for the compressed region 144 being able to potentially store more pages in their compressed form than the uncompressed region 142. The allocation controller 202 may provide the allocated shadow address range 310 to the host device 110 or fabric manager 280. In a pooled configuration, the allocation controller 602 may independently allocate different shadow address ranges 310 for different compressed regions 144 in response to VDMs from the host devices 110 or a fabric manager 280 during compression setup.

The page table 612 maps HPAs (in the normal address space 304 or the shadow address space) to PMAs of the memory array 140. For memory addresses in the shadow address space 306, the corresponding page table entries (e.g., stored to a $2^{nd}$ level page table) may store compression context metadata that enables retrieval and decompression of the data. The compression context metadata may include a pointer to the PMA associated with the compressed page and various decompression parameters such as a data size of the compressed page, a compression scheme, or various other information. In an embodiment, the page table may comprise multiple levels. In one such implementation, as described above, a first-level page table maps HPAs in the normal address space 304 directly to their corresponding PMAs and maps HPAs in the shadow address space 306 to a page table entry of a second-level page table. The second-level page table entry may store the compression context metadata (or a reference to it) to enable decompression of a corresponding compressed page. The page table 120 may additionally store other information such as physical addresses of free pages and various metadata. As described above, the first-level page table may be configured for deferred allocation.

The page table manager 606 manages the page table of the memory buffer device 130. Upon receiving memory commands, the page table manager 606 performs lookups of the HPAs in the page table 612 to identify the corresponding physical memory addresses and, for compressed pages, the compression context metadata. The page table manager 606 may furthermore manage updates to the page table 612.

The compression/decompression engine 604 performs compression of data when writing to the compressed region and decompression when reading from the compression region. Specific compression/decompression parameters such as compression/decompression type, compression ratio, etc. may be preset or configurable by the memory buffer device 130.

The VDM controller 608 manages processing of VDMs received from the host device 110. VDMs may be utilized in association with allocation and deallocation of compressed regions, to facilitate migration of host-compressed data to the memory array 140, to facilitate migration of compressed data directly to the host device (without decompression), to facilitate transfer of data between the compressed region and the uncompressed region, or other functions described herein. VDM messages may be communicated using either in-band message formats (e.g., using CXL.io or Data Object exchange (DOE) formats) or out-of-band using communication interfaces such as SMBus, I3c, etc.

The capacity tracker 610 tracks available memory slots in the compressed region 144 available for storing compressed pages. The available slots may be communicated to the host device 110 or fabric manager 280 via a VDM or via a read from a register of the memory buffer device 130 or designated memory address to enable the host device 110 to avoid overrunning available memory. Furthermore, the host device 110 or fabric manager 280 may preemptively designate additional regions of compressed memory or deallocate regions of compressed memory as may be needed.

Figure 7:
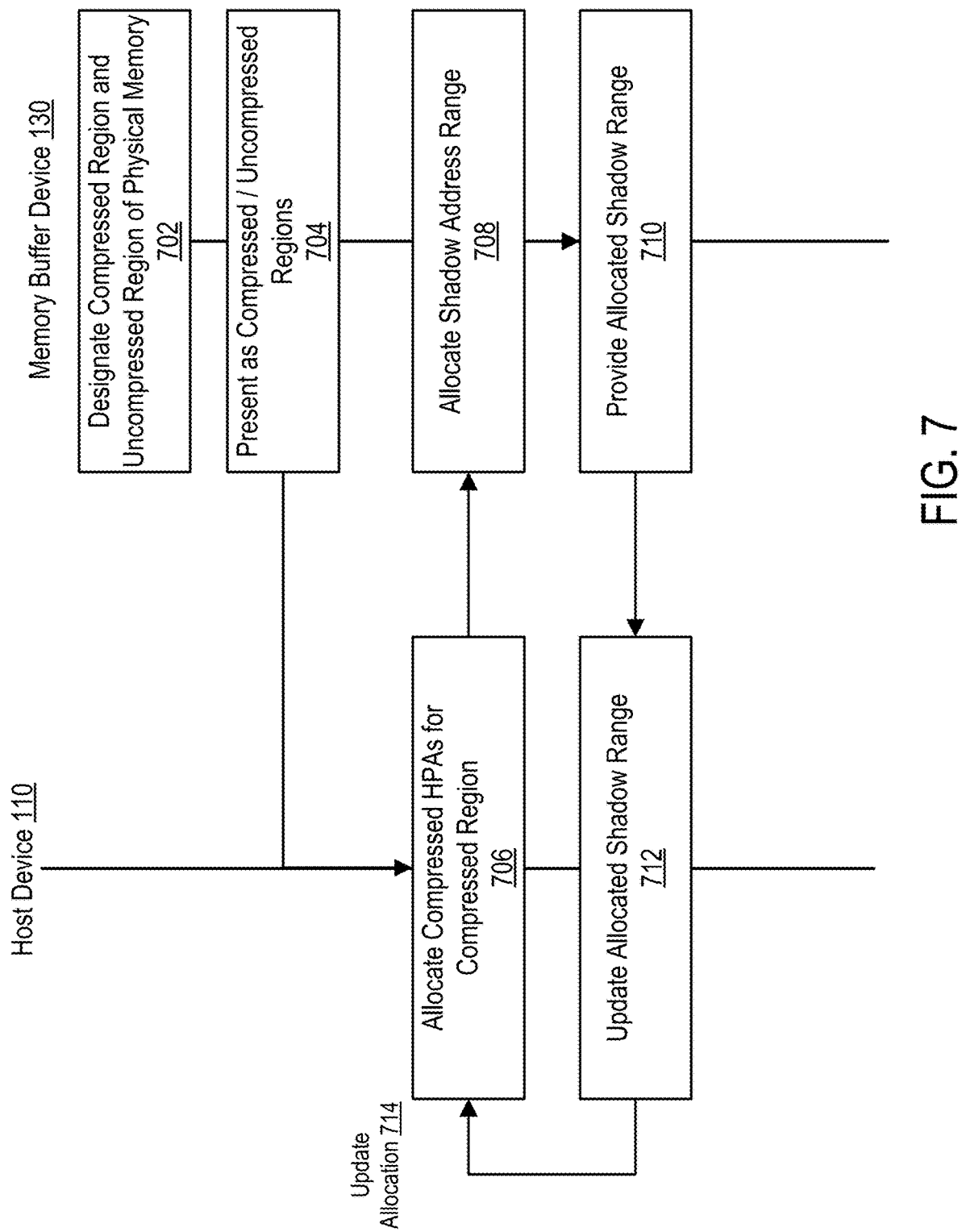
FIG. 7 is a flowchart illustrating an example embodiment of a process for allocating compressed storage in a memory system.

FIG. 7 illustrates an example embodiment of a process for allocating compressed storage in a memory system 100, 200. The memory buffer device 130 initially designates 702 a compressed region 144 and an uncompressed region 142 of physical memory. In an embodiment, the memory buffer device 130 may configure the allocation at boot. Alternatively, the host device 110 may dictate the allocation to the memory buffer device 130 when the memory buffer device 130 comes online. The memory buffer device 130 may then present 704 to a connected host device 110 (or fabric manager 280) as respective memories (e.g., NUMA nodes) with the allocated sizes. The host device 110 allocates 706 a range of HPAs 302 for compressed storage (designating as a restricted address range 308), which may be indicated to the memory buffer device 130 in a VDM. The memory buffer device 130 then allocates 708 a shadow address range 310 corresponding to the compressed region 144 and provides 710 the allocated shadow range 310 to the host device 110. In an alternative embodiment, the allocation 708 may instead be performed by the host device 110 or a fabric manager 280 (in which case, the allocation is instead communicated from the host device 110 or fabric manager 280 to the memory buffer device 130). The host device 110 may then update 712 its data structure (e.g., free list) storing allocated HPAs 302 to enable allocation of the shadow range to host processes. The host device 110 may trigger a update 714 to flexibly change the size of the restricted range 308 allocated for the compressed region 144. For example, the host device 110 may update the allocation depending on the demand for allocation from executing processes (e.g., by designating an additional compressed region 144 or changing the size of compressed region 144). In a pooled memory architecture such as in FIG. 2, the allocation steps may be performed by the fabric manager 280 instead of the individual host device 110.

Figure 8:
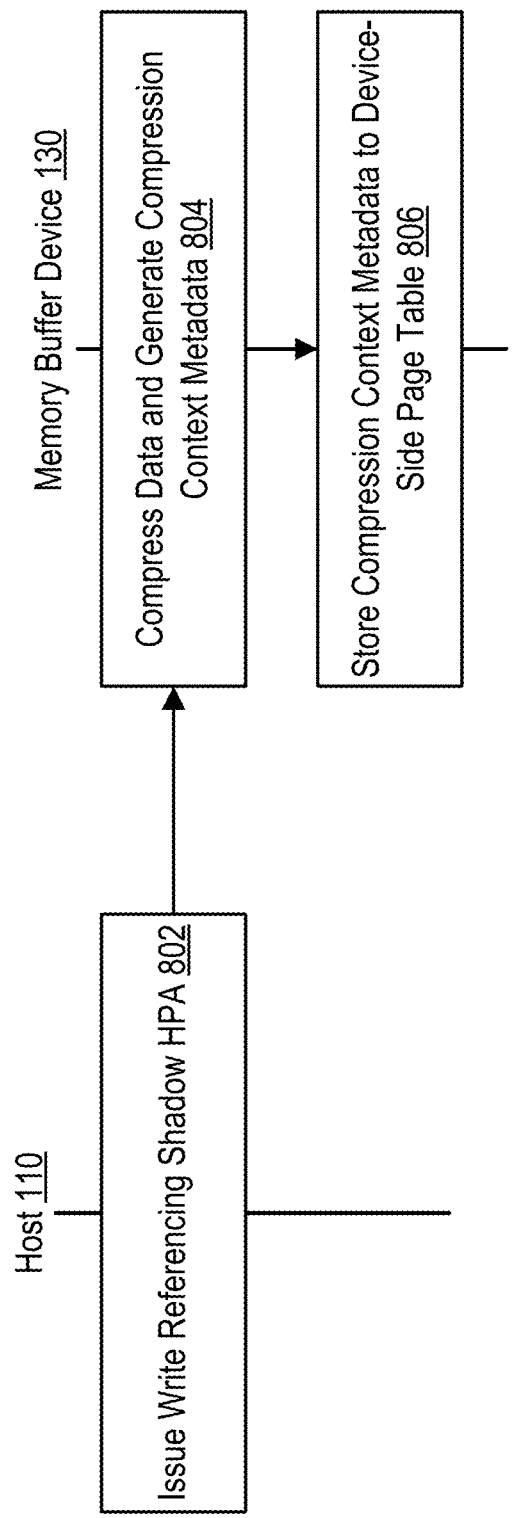
FIG. 8 is a flowchart illustrating an example process for writing data from a host device that operates on uncompressed data to a remote memory that stores the data in compressed form.

FIG. 8 illustrates an example embodiment of a process for writing uncompressed data from a host device 110 to compressed storage of a memory module 160. The host device 110 issues 802 a write referencing a shadow HPA indicating that the data should be stored in compressed form. The memory buffer device 130 compresses 804 the data into the compressed region 144 and generates associated compression context metadata. The memory buffer device 130 stores 806 the compression context metadata to the device-side page table.

Figure 9:
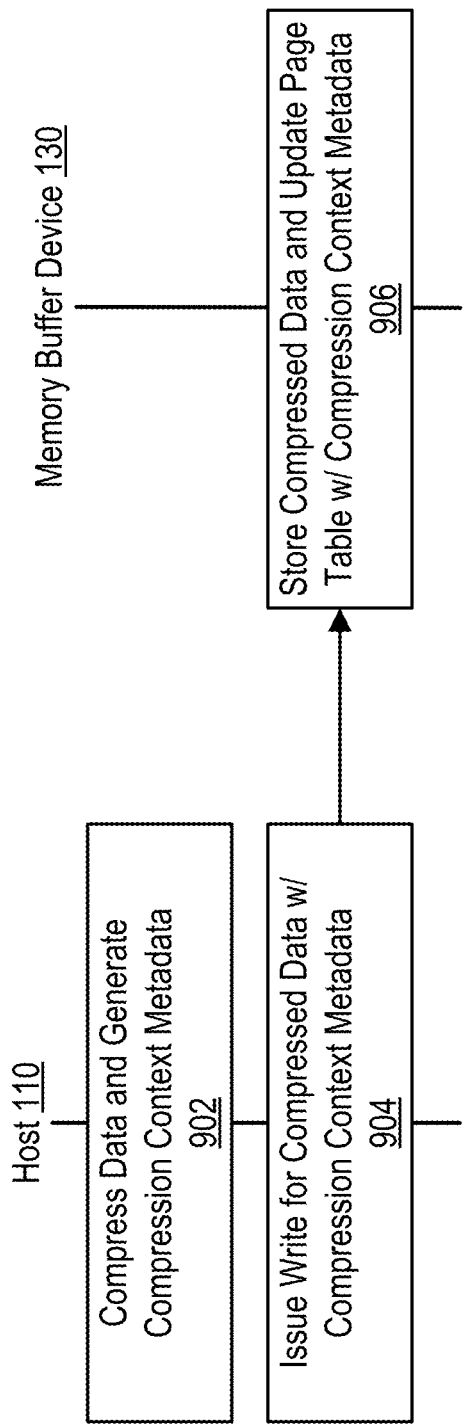
FIG. 9 is a flowchart illustrating an example process for migrating compressed data from a host device to a remote memory.

FIG. 9 illustrates an example embodiment of a process for writing host-compressed data from a host device 110 to a memory module 160. The host device 110 compresses 902 data and generates associated compression context metadata. The host device 110 issues 904 a command to write the compressed data to a shadow HPA and sends the compressed data and compression context metadata. The memory buffer device 130 stores 906 the compressed data to the compressed region 144 (bypassing device-side compression) and updates the page table with the compression context metadata.

Figure 10:
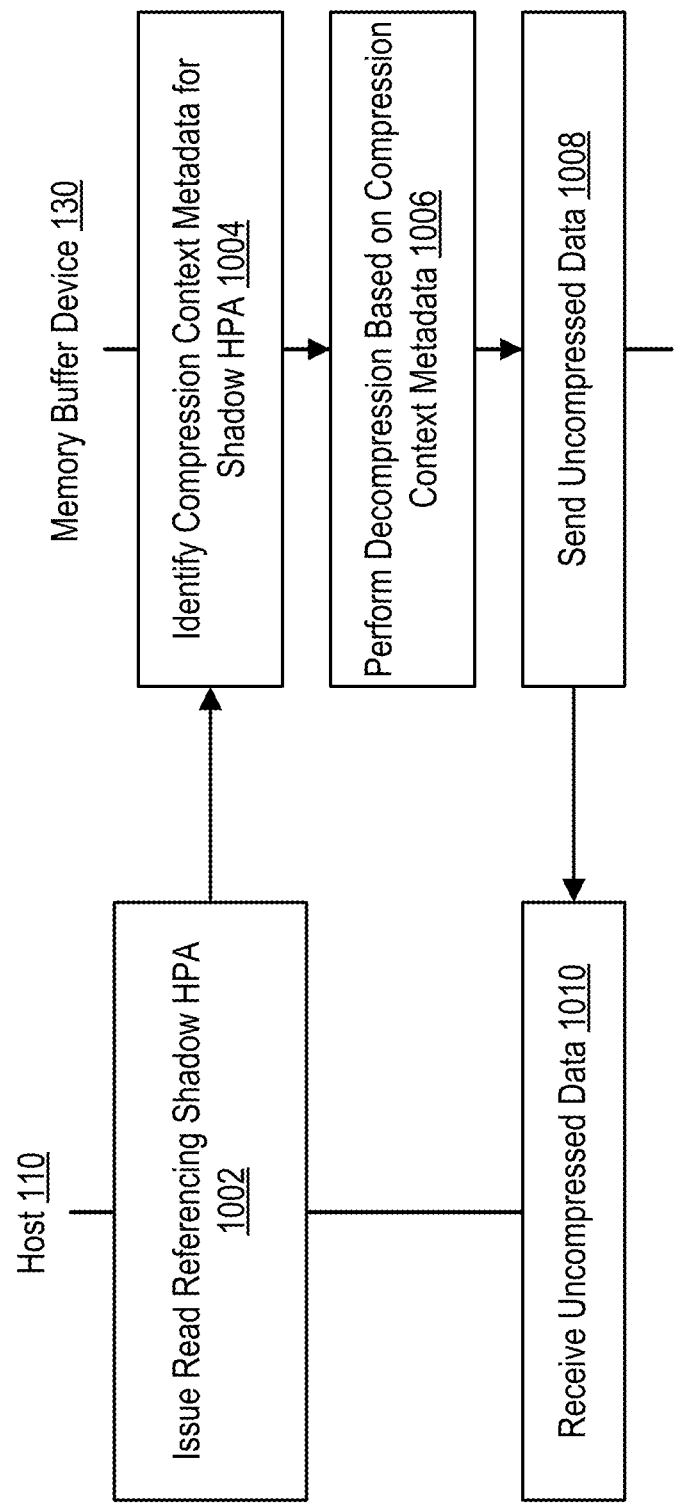
FIG. 10 is a flowchart illustrating an example process for reading data from a remote memory that stores the data in compressed form to a host device that operates on uncompressed data.

FIG. 10 illustrates an example embodiment of a process for accessing uncompressed data from compressed storage. The host device issues 1002 a read referencing the shadow HPA, and the memory buffer device 130 identifies 1004 the compression context metadata for the shadow HPA. The memory buffer device 130 performs 1006 decompression based on the compression context metadata and sends 1008 the uncompressed data to the host device 110. The host device 110 receives 1010 the uncompressed data.

Figure 11:
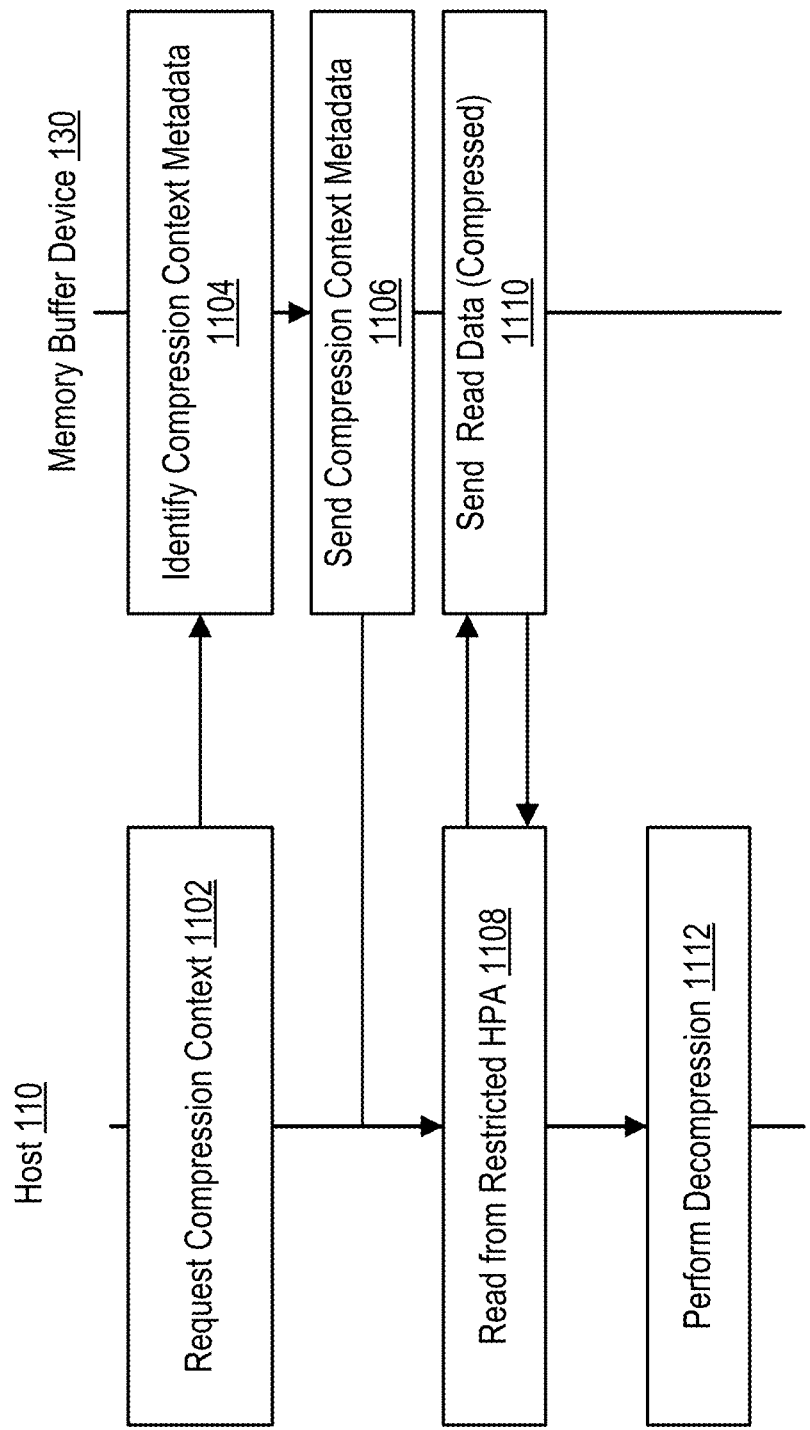
FIG. 11 is a flowchart illustrating an example process for migrating compressed data from a remote memory to a host device.

FIG. 11 illustrates an example embodiment of a process for accessing compressed data in compressed form (e.g., for host-side decompression). The host device 110 requests 1102 compression context metadata associated with a shadow HPA. The memory buffer device 130 identifies 1104 the compression context metadata and sends 1106 the compression context metadata to the host device 110. Using the compression context metadata, the host device 110 may perform 1108 read operations referencing the restricted HPA obtained from the compression context metadata. The memory buffer device 130 executes 1110 the read operations and returns the compressed data directly, without decompression. The host device 110 may then perform 1112 decompression.

The processes of FIGS. 8-11 may be performed in various combinations on the same data. For example, data that is compressed and stored according to the process of FIG. 8 may subsequently be read according to either the process of FIG. 10 (to obtain the data in uncompressed form) or FIG. 11 (to obtain the data in compressed form). Similarly, data the is directly migrated in compressed form according to the process of FIG. 9 may be subsequently read according to either the process of FIG. 10 or FIG. 11.

Various components of the host device 110 and/or the memory buffer device 130 may be implemented in hardware (e.g., using digital logic circuits), firmware, and/or software (e.g., as functions of a CPU, a memory management module, and/or an operating system executing on the host device 110). For software functions, a CPU of the host device may execute instructions stored to a non-transitory computer-readable storage medium. Functions of the control logic 132 of the memory buffer device 130 may similarly be implemented in hardware (e.g., using digital logic circuits), firmware, software (e.g., based on instructions stored to a non-transitory computer-readable storage mediums and executed by a processor), or any combination thereof.

Upon reading this disclosure, those of ordinary skill in the art will appreciate still alternative structural and functional designs and processes for the described embodiments, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A memory buffer device comprising:
a host-side interface for communicating with a host device;
a memory-side interface for communicating with a memory; and
control logic to access compressed data from the memory and return the compressed data in compressed form to the host device via the host-side interface responsive to a first read operation associated with a first address in a first block of host-visible addresses, and to access compressed data in the memory, decompress the compressed data, and return decompressed data to the host device via the host-side interface in response to a second read operation referencing a second address in a second block of host-visible addresses.

2. The memory buffer device of claim 1, wherein the control logic is further configured to receive a write command and uncompressed data for writing to a third address in the second block of host-visible addresses, compress the uncompressed data, and store compressed data to the memory in association with the third address.

3. The memory buffer device of claim 1, wherein the control logic is further configured to receive compression context metadata with compressed data, and wherein the control logic stores the compressed data to the memory based on the compression context metadata.

4. The memory buffer device of claim 1, wherein the control logic is further configured to receive a write command and uncompressed data for writing to a fourth address in a third block of host-visible addresses and store the uncompressed data to the memory in association with the fourth address.

5. The memory buffer device of claim 1, wherein the first block of host-visible addresses is contiguous in a host address space of the host device.

6. The memory buffer device of claim 1, wherein the second block of host-visible addresses is contiguous in a host address space of the host device.

7. The memory buffer device of claim 1, wherein the control logic is further configured to receive a message from the host device allocating the first block of host-visible addresses, and wherein the control logic allocates the second block of host-visible addresses in response to the message.

8. The memory buffer device of claim 1, wherein the control logic is further configured to block write requests to the first block of host-visible memory addresses.

9. The memory buffer device of claim 1, wherein the control logic is further configured to track compressed memory capacity remaining in the memory, and to send a message to the host device indictive of the compressed memory capacity.

10. The memory buffer device of claim 1, wherein the control logic is further configured to receive a request from the host device for the compressed data that includes the second address in the second block of host-visible addresses, and wherein the control logic returns compression context metadata to the host device that includes the first address in the first block of addresses, to enable the host device to execute the first read operation.

11. The memory buffer device of claim 1, wherein the memory buffer device is integrated with the memory in a memory module.

12. The memory buffer device of claim 1, wherein the memory buffer device communicates with the host device via a CXL protocol.

13. A memory module comprising:
a host-side interface for communicating with a host device;
a memory; and
control logic to access compressed data from the memory and return the compressed data in compressed form to the host device via the host-side interface responsive to a first read operation associated with a first address in a first block of host-visible addresses, and to access compressed data in the memory, decompress the compressed data, and return decompressed data to the host device via the host-side interface in response to a second read operation referencing a second address in a second block of host-visible addresses.

14. The memory module of claim 13, wherein the control logic is further configured to receive a write command and uncompressed data for writing to a third address in the second block of host-visible addresses, compress the uncompressed data, and store compressed data to the memory in association with the third address.

15. The memory module of claim 13, wherein the control logic is further configured to receive compression context metadata with the compressed data, and wherein the control logic stores the compressed data to the memory based on the compression context metadata.

16. The memory module of claim 13, wherein the control logic is further configured to receive a write command and uncompressed data for writing to a fourth address in a third block of host-visible addresses and store the uncompressed data to the memory in association with the fourth address.

17. The memory module of claim 13, wherein the control logic is further configured to track compressed memory capacity remaining in the memory, and to send a message to the host device indictive of the compressed memory capacity.

18. The memory module of claim 13, wherein the control logic is further configured to receive a request from the host device for the compressed data that includes the second address in the second block of host-visible addresses, and wherein the control logic returns compression context metadata to the host device that includes the first address in the first block of addresses, to enable the host device to execute the first read operation.

19. A method for operating a host device interfaced to a memory module, the method comprising:
storing a first allocation of a first block of host-visible addresses associated with a compressed region of a memory;
storing a second allocation of a second block of host-visible addresses associated with the compressed region of the memory;
issuing a first read operation associated with a first address in the first block of host-visible addresses to access data from the memory module in compressed form; and
issuing a second read operation associated with a second address in the second block of host-visible addresses to access the data from the memory module in uncompressed form.

20. The method of claim 19, further comprising:
prior to issuing the second read operation, issuing a request for compression context metadata associated with the second address in the second block of host-visible addresses, the compression context metadata referencing the first address in the first block of host-visible addresses, and the compression context metadata including compression parameters to enable access and decompression of the data by the host device.

* * * * *